INVENTOR.
JAMES KILBURG
BY
Fryer & Tjensvold
ATTORNEYS

AUTOMATIC TELEPHONE DIALER OF THE MAGNETIC STORAGE TYPE

Filed April 30, 1962 5 Sheets-Sheet 2

INVENTOR.
JAMES KILBURG
BY
Fryer & Tjensvold
ATTORNEYS

Jan. 11, 1966 J. KILBURG 3,229,042

AUTOMATIC TELEPHONE DIALER OF THE MAGNETIC STORAGE TYPE

Filed April 30, 1962 5 Sheets-Sheet 3

INVENTOR.
JAMES KILBURG
BY
Fryer & Tjensvold
ATTORNEYS

INVENTOR.
JAMES KILBURG
BY
Fryer - Tjensvold
ATTORNEYS

INVENTOR.
JAMES KILBURG
BY
Fryer & Tjensvold
ATTORNEYS

United States Patent Office 3,229,042

Patented Jan. 11, 1966

3,229,042

AUTOMATIC TELEPHONE DIALER OF THE MAGNETIC STORAGE TYPE

James Kilburg, San Carlos, Calif., assignor to Dasa Corporation, a corporation of California Filed Apr. 30, 1962, Ser. No. 191,050
11 Claims. (Cl. 179—90)

The present invention relates to automatic telephone dialers of the magnetic storage type and particularly to a telephone dialer designed to satisfy all dialing requirements of a subscriber with a minimum possibility of failure of the machine through its own mechanical elements or through careless or negligent operating techniques on the part of the subscriber.

The term "dialer" is now accepted in the art of telephony as mechanism capable of producing impulses in a telephone circuit for the purpose of completing connections between the telephones of two subscribers irrespective of whether a finger actuated dial familiar to conventional telephone sets is employed.

The objects of the present invention may best be understood by recitation of the several functions the dialer must accomplish to give full, satisfactory and accurate service even to unskilled operators who must be expected to use equipment of this type.

An automatic telephone dialer for universal use must have some repertory mechanism capable of containing a large number of telephone numbers in code as well as space for displaying the names of subscribers. It must be capable of dialing any simple or local telephone number and also of dialing any telephone number having one or more dial tone wait periods. For example, some inter-office telephone systems afford connection with the outside or general telephone system upon dialing a single number such as the number nine and these systems are commonly referred to as "nine level dialing systems." When a single number has been dialed, the caller must await the reception of a dial tone from the general system before placing his local or other number to be called. Thus in calling from a nine level system, as well as in calling through some types of direct distance dialing systems, an automatic dialer must be capable of transmitting or decoding a portion of a number and then of stopping for a more or less indefinite period until a dial tone is heard so that dialing of the remainder of the number may be initiated. This gives rise to difficulties which might result from a person starting to dial a number and then abandoning his intention when only a portion of the dialing cycle has been completed. This would result in the machine being unfit for completing a new dialing cycle and, in the magnetic storage type dialer, might result in the erasing of many numbers through adjustment of the repertory mechanism while the magnetic transducer or head which reads numbers, and is equally capable of erasing numbers, is in its reading position. A dialer must also be capable of decoding or dialing in a single cycle as many as fourteen digits which might be required for example in dialing through a nine level system followed by a direct distance dialing process. It is also desirable that the adjustment of the repertory mechanism from one subscriber position to another be capable of rapid as well as accurate operation and it is most desirable that a minimum of push buttons or other operating mechanisms be presented to avoid confusion of persons operating the dialer. Means should also be provided to interrupt a dialing cycle of the machine manually in certain events and automatically in other events for the protection of the machine itself and to prevent erasure of coded numbers in the repertory mechanism.

Since electrical circuitry is employed for encoding telephone numbers in an automatic dialer as well as for decoding such numbers, means must be provided for simple selection of various circuits for performing differen necessary functions. Furthermore since the circuits of an automatic dialer must be connected with the telephone circuit, shunting means must be provided for protection of the telephone circuit in the event of failure of any of the electrical or electronic components in the circuit of the dialer itself.

The object of the present invention is therefore to produce an automatic telephone dialer having all of the above and further advantages and capabilities. Further and more specific objects and advantages and the manner in which the invention is carried into practice are set forth in the following specification wherein reference is made to the accompanying drawings.

Figure 1:
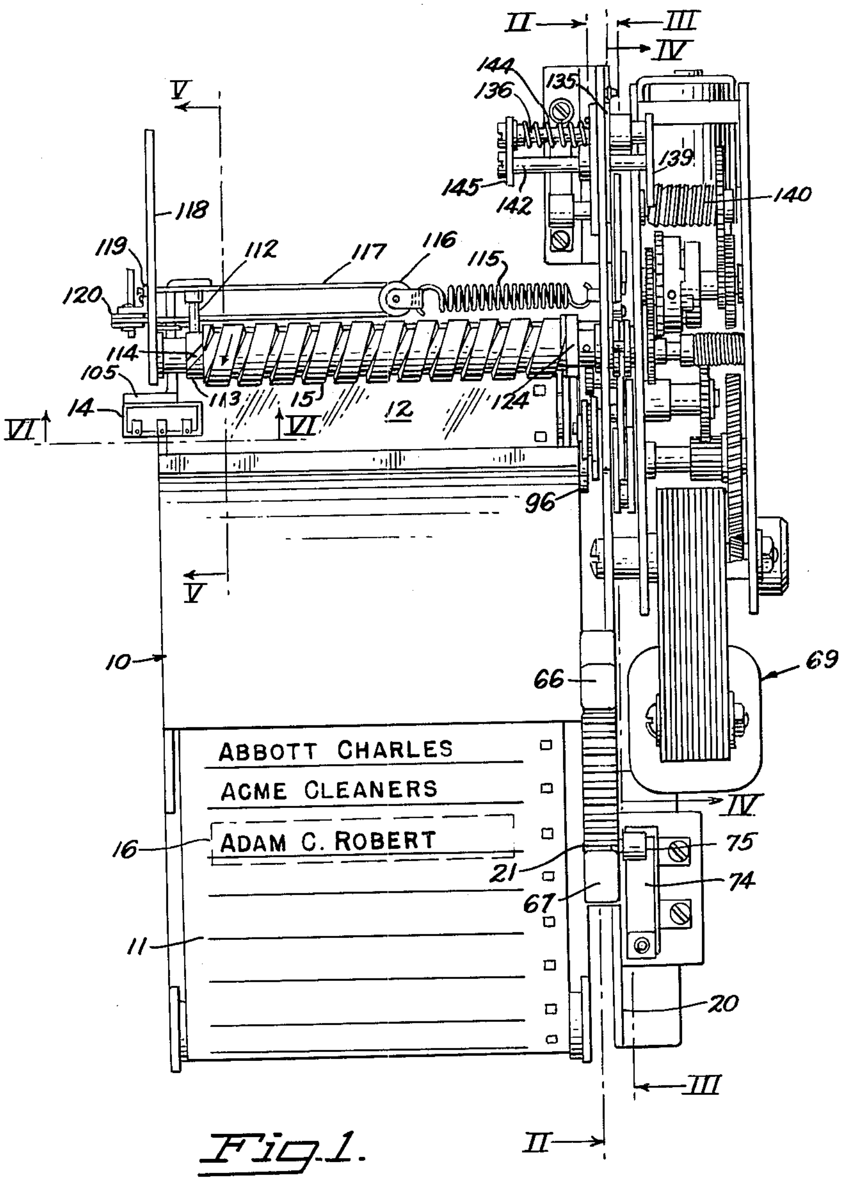
FIG. 1 is a plan view of the frame work and operating mechanism of an automatic telephone dialer embodying the present invention eliminating the electronic components, external housing and base plate and other members not essential to an understanding of the present invention.

Referring first to FIG. 1 of the drawings, the machine of the present invention is shown as having a tape cartridge generally indicated at 10 which presents one side of a tape at 11 and the opposite side of the same tape at 12. This tape cartridge is described in detail in a copending application of James Kilburg entitled "Tape Magazine for Automatic Telephone Dialer," filed April 27, 1962, Serial No. 190,586 now Patent No. 3,207,453. It will be sufficient for the purposes of the present application to understand that this tape magazine contains an elongated tape preferably of mylar or other stable and durable plastic film. The tape is coded on one side with magnetizable material capable of having spaced magnetized bits imposed thereon to be read by a transducer and translated into electrical impulses in a telephone circuit. The opposite side of the tape is coated to produce a light color upon which typed or written information can readily be seen. Thus the names of subscribers are placed on the light colored side of the tape in the area shown at 11 in FIG. 1 and the tape is inverted by passing over rollers as disclosed in the above mentioned pending application so that the magnetizable side of the tape is exposed in the area 12 directly beneath a transducer or head 14 capable of being driven transversely of the tape from its position at the left side thereof, as shown in FIG. 1 toward the opposite edge of the tape by a feed screw 15. To operate the machine for dialing a telephone number, the name of the subscriber to be called is positioned by advancing or moving the tape longitudinally until the name appears in a frame arranged on a housing window (not shown), the position of which is indicated in dotted lines at 16. With the name in this position, the corresponding code for the subscriber's telephone number is arranged on the tape in a transverse line directly beneath the head 14. The head which is disposed slightly above the tape in its home position is then brought into contact with the tape and driven across the tape for the purpose of decoding the number which has been encoded thereon.

Figures 2, 4, 7, 8, 9, 10:
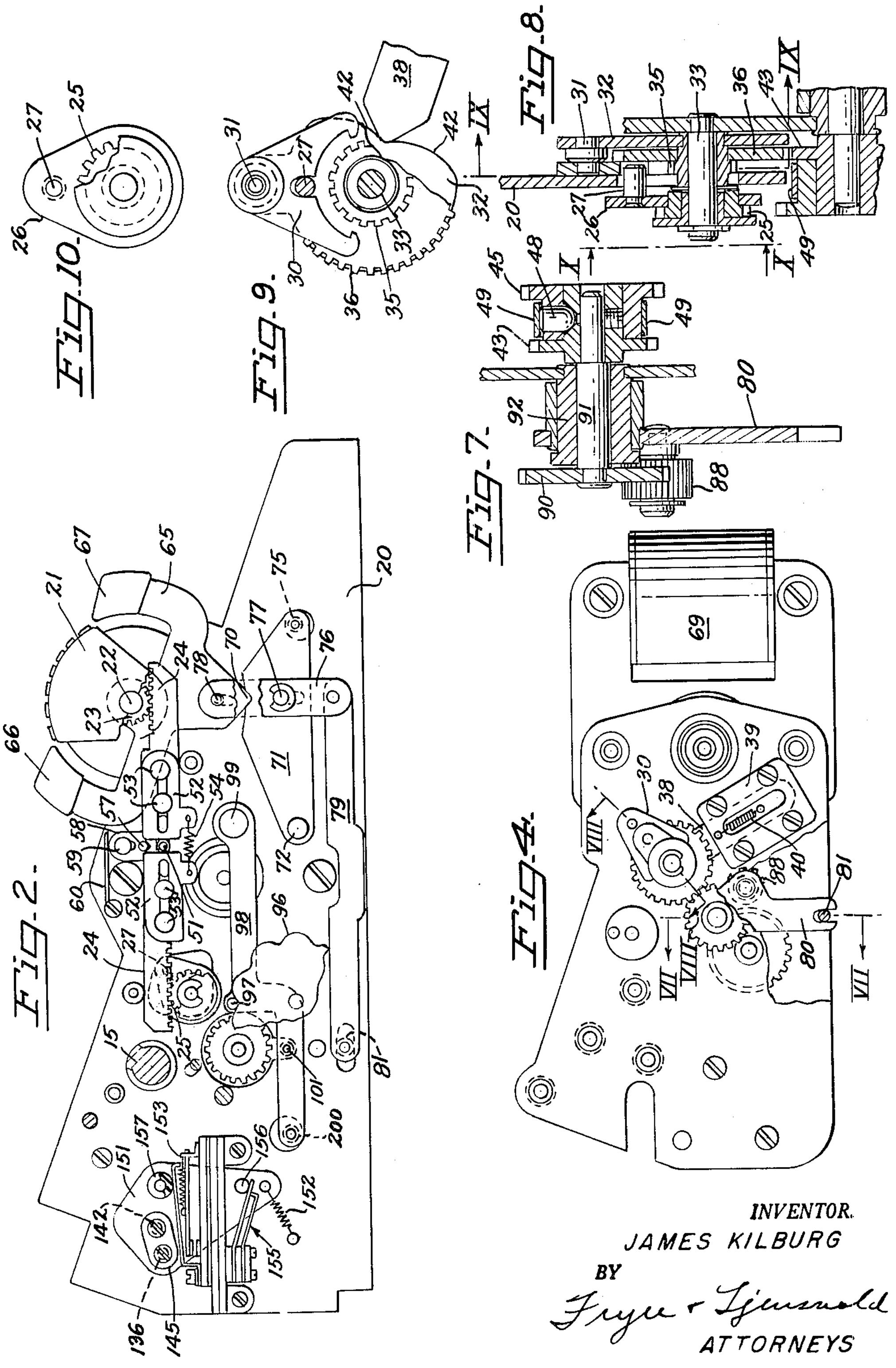
FIG. 2 is a view taken on the line II—II of FIG. 1 and illustrating parts of the repertory adjusting mechanism.
FIG. 4 is a view taken on the line IV—IV of FIG. 1 illustrating the motor which powers the machine and certain drive components.
FIG. 7 is an enlarged fragmentary view taken on the line VII—VII of FIG. 4.
FIG. 8 is an enlarged fragmentary view taken on the line VIII—VIII of FIG. 4.
FIG. 9 is a fragmentary section with portions broken away taken on the line IX—IX of FIG. 8 and illustrating the operation of a double acting ratchet mechanism.
FIG. 10 is an enlarged view with portions broken away taken on the line X—X of FIG. 8.

Advancing of the tape in either direction for the purpose of bringing a certain subscriber's name and the corresponding coded number into operating positions may be accomplished slowly step by step with manual power or may be accomplished rapidly with a motor drive. Manual advancing of the tape is accomplished by mechanism supported principally on a main frame plate of the machine shown at 20 and the mechanism is illustrated in FIG. 2. A knurled segment 21 is finger actuated to rock it about a pivot pin 22. A gear 23 movable with the segment meshes with one end of a rack bar 24 which has an opposite end extending rearwardly of the machine and toothed for engagement with a gear 25. Since movement of the segment 21 in opposite directions is intended to advance the tape in opposite directions at least one or two spaces, double ratchet mechanism is employed so that forward movement of the segment 21 advances the tape forwardly only and rearward movement thereof advances it rearwardly only. This ratchet mechanism is shown in FIGS. 8, 9 and 10 where the gear 25 is illustrated as having a plate 26 pressed to its hub for movement therewith. A pin 27 carried by this plate therefore swings through an arcuate path upon oscillation of the gear. This pin extends through the main frame plate 20 as can be seen in FIG. 8 and engages a notch as shown in FIG. 9 in a double pawl 30. This pawl is pivotally supported on a pin 31 (see also FIG. 8) carried by a pawl support and detent plate 32 which is rotatable with respect to a shaft 33. A ratchet wheel 35 designed to receive either of the two oppositely disposed teeth of the double pawl element also rotates relative to the shaft 33 and imparts rotation to a gear 36 pressed upon its hub as is the pawl support plate 32.

With the mechanism thus far described, movement of the rack bar 24 upon actuation of the segment 21 rotates the gear 25 and its associated pin 27 first to rock the double pawl 30 into engagement with the gear 35 and then to rotate said gear also imparting rotation to the larger gear 36. This rotation is accompanied by similar movement of the pawl support and detent plate 32 held in the home position shown in FIG. 9 by a spring pressed detent 38. This detent 38 is shown in FIG. 4 as mounted in a guide plate 39 and urged toward its engaging position by a spring 40. The detent plate has cammed edges 42 (see FIG. 9) so that the resilient force exerted by the detent 38 returns it to its central or home position when the finger is removed from the actuating segment 21. The rotation of gear 36 imparts rotation to a gear 43 (see also FIG. 7), where the view is taken from the opposite side with respect to FIG. 8, and gear 43 imparts rotation through an overload slip clutch to a gear 45. This gear 45 meshes with a gear, not shown, which is carried on the side of the tape cartridge 10 and associated with the tape in a manner to affect its advancement as fully set forth in the application hereinabove referred to. This gear arrangement, of course, is to permit removal of the tape cartridge from the machine of the present invention. The overload slip clutch between gears 43 and 45 is to prevent tearing of the tape in the event that motion of the tape is prevented as for example by complete unwinding from one of the spools upon which it is supported. The clutch comprises a detent pin 48 slidably supported in the hub of gear 45 and engaging a suitable depression in the rub of gear 43. A collar-shaped leaf spring 49 surrounds the hub of gear 45 and bears inwardly on the detent 48 with just sufficient force to retain it in engaged position until excessive force is applied to the tape drive mechanism. To augment the action of the detent 38 shown in FIG. 9 and aid in returning the rack bar 24 and actuating segment 21 to their normal position, a centering spring mechanism is associated with the rack bar as best shown in FIG. 2. This mechanism comprises a pin 51 carried by the frame plate 20 and extending through a suitable slot in the rack bar. A pair of sliding spring anchors 52 are carried by the rack bar on shoulder pins 53 which extend through slots in the spring anchors. A spring 54 urges the spring anchors toward each other to the limit allowed by the pins 53 in their respective slots producing space between the two spring anchors which embraces the pin 51. Therefore upon movement of the rack bar in either direction, both spring anchors tend to move with it but one engages and is stopped by the pin 51 so that the spring 54 is tensioned and will return the rack bar to its central position. The rack bar is also preferably retained in its central position by a detent shown as a pin 57 engaging a suitable notch in the top edge of the rack bar and carried by a sliding plate 58 guided by shoulder pins, one of which is shown at 59, and urged downwardly by a leaf spring 60.

Figure 15:
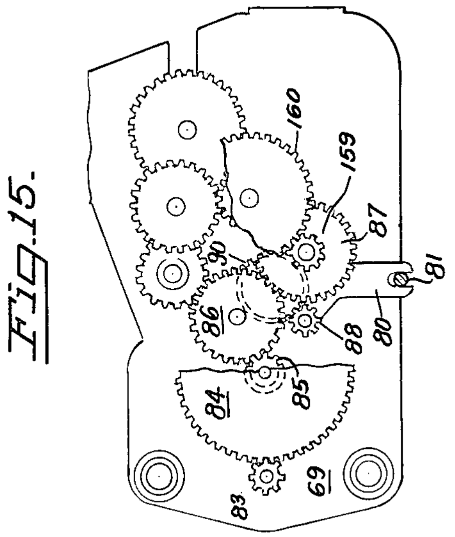
FIG. 15 is a fragmentary detail showing a gear train from a motor toward a tape advancing mechanism.

Since the machine of the present invention has a capacity for approximately 1200 subscribers' names and telephone numbers encoded on the tape, the tape is in the order of 30 feet long and adjustment of the tape from a name adjacent one end to another name adjacent the other end would constitute a tedious manual procedure. Consequently the machine includes power or motor driven adjusting means for the tape to advance it great distances rapidly while the manual adjusting means just described can thereafter be used to bring the tape to precise position for decoding the telephone number of a particular subscriber. Advancing of the tape by power means is controlled by a double ended lever 65 opposite ends of which are aligned with and disposed adjacent the manual actuating segment 21 as also shown in FIG. 1. The lever 65 is pivotally supported on the same axis as the actuator 21 and upon being rocked away from the operator as by depression of its end 66, the tape will advance away from the operator. Similarly depression of the end 67 of the lever will advance the tape toward the operator. Conseqeuntly depression of either end of the lever 65 and subsequent movement of the actuator 21 provides a convenient and natural method of adjusting the tape to any desired position. An electric motor shown at 69 in FIG. 1 is provided to drive the tape through a gear train and reversing mechanism presently to be described. A rocking motion of the lever 65 in either direction closes the switch to energize the motor through means shown in FIGS. 2 and 3. In FIG. 2, the lever 65 is shown as having a toe 70 engaging a notch in the upper edge of a lever 71 which is pivotally supported by a pin 72. Upon depression of either end of the lever 65 the toe 70, in riding out of its notch, depresses the lever 71 to effect closing of a switch 74 (see FIG. 3) which energizes the motor 69. This is caused by an insulated bushing 75 carried on the end of the lever 71 and projecting through the frame plate 20. Closing of the switch 74 to energize the motor is accomplished first among several things which occur upon depression of the lever 65 to insure some time (a small fraction of a second) for the motor to come up to speed before it is subjected to a load and also to insure complete meshing of teeth in the gear train. Also actuated by depression of the lever 65 is a lever 76 pivotally supported as at 77 by a pin supported by the frame plate 20 and extending through a slot in lever 71 which slides behind the lever 76. The upper end of the lever 76 has a pin and slot connection 78 with the lever 65 so that rocking movement of lever 65 causes oscillation of the lever 76 about its pivot pin 77. The lower end of lever 76 is connected by a link 79 with the bifurcated end of a reverse gear lever 80 (see FIG. 4) by means of a pin 81. The gear train which includes the reverse gear is shown in FIG. 15. In this figure, the motor is shown as having a pinion 83 driving a large gear 84 and a second pinion 85 secured thereto. Pinion 85 drives a pair of meshing gears 86 and 87 of equal diameter which will of course rotate in opposite directions. The reversing gear lever 80 also shown in FIG. 7 carries a pinion 88 which, upon swinging of the lever 80, will mesh selectively with the gear 86 or the gear 87. Thus the pinion 88 may be driven in either direction and it meshes with a gear 90 concentric with a shaft 91 (FIG. 7) about which the lever 80 is pivotally supported. The gear 90 is fixed to and drives the shaft 91 which rotates in a bushing 92. The opposite end of the shaft 91 is that upon which the hub of gear 43 is mounted so that the tape is advanced through the slip clutch 48 in the manner previously described. Thus upon depression of the lever 65 of FIG. 2 and immediately after the circuit to the motor has been closed, the link 79 and reverse gear lever 80 effects selection of direction depending upon the end of the lever 65 which has been depressed. All of the power drive actuating linkage just described including the lever 65 is normally held in its neutral position by a pair of springs shown in FIG. 3 at 93 acting to urge a pair of sliding plates 94 toward engagement with the pin 81 on the end of link 79 so that upon depression of either end of the lever 65 and movement of link 79 either one or the other of springs 93 is tensioned to return the control mechanism to its neutral position.

In connection with adjustment of the tape either manually or by power, it is necessary that the tape come to rest with the information encoded thereon directly beneath the transducer head 14 and it is consequently desirable to provide a detent mechanism inducing the tape to stop with the line of coded information thereon precisely positioned. For this purpose, a detent wheel shown at 96 in FIG. 1 is carried by the tape driving mechanism on the cartridge 10 and when the cartridge is inserted in the machine the detent wheel occupies the position where it is shown in FIG. 2. A detent pin 97 is carried on a lever 98 for registry with the notches of the detent wheel and the lever is pivotally supported as by a pin 99. It is undesirable during rapid movement of the tape while it is motor driven to have the friction and noise created by the rotating detent wheel 96 against the detent pin 97. Consequently the pin is raised out of contact with the wheel during power driving of the tape. This is accomplished by swinging the lever 98 upwardly about its pivot point by a lever 100 (see FIG. 3) centrally pivoted to the frame. The upper end of the lever has a cam notch receiving a pin 101 carried as shown in FIG. 2 by the lever 98. A spring 102 urges the pin 101 and lever 98 downwardly. When the power drive control is manipulated to move the link 79 in either direction, the same pin 81 on the lever 79 which actuates the reverse gear lever projects into a slot in the lower end of lever 100 swinging the lever about its central pivot and causing the cam notch in its upper end to raise the pin 101 and consequently raise the lever 98 until the detent pin thereon is out of engagement with the detent wheel 96. The centering mechanism actuated by springs 93 also serves to return the lever 100 to its central position immediately upon release of the power drive control lever 65.

Figure 5:
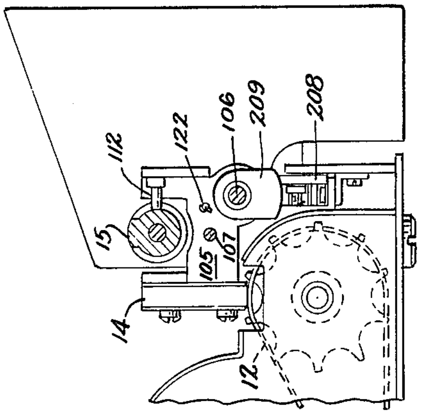
FIG. 5 is a fragmentary view taken on the line V—V of FIG. 1 showing a transducer in contact with a magnetic tape upon which telephone numbers are encoded.
Figure 16:
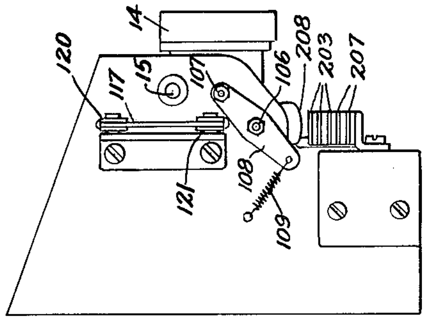
FIG. 16 is a fragmentary elevation of the transducer shown in FIG. 1 and mechanism associated therewith.
Figure 6:
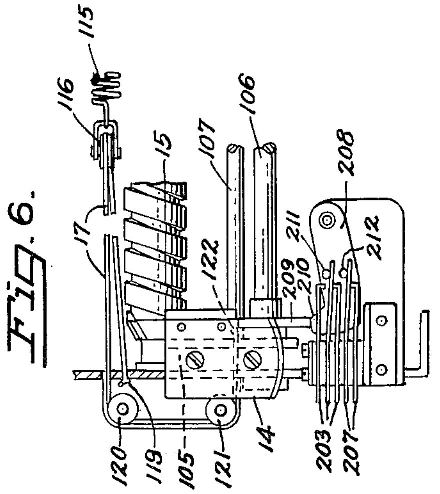
FIG. 6 is an enlarged fragmentary view taken on the line VI—VI of FIG. 1 illustrating switching means used in connection with the transducer.
Figure 14:
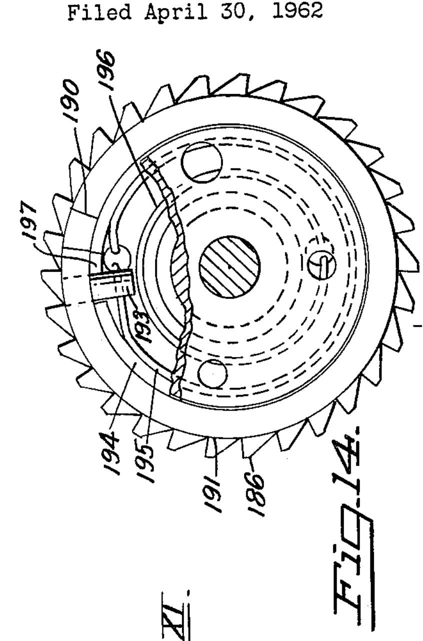
FIG. 14 is a sectional view with parts broken away taken on the line XIV—VIV of FIG. 13.
Figure 13:
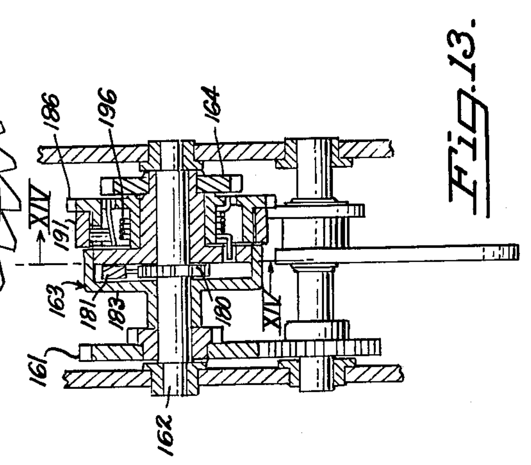
FIG. 13 is a sectional view taken on the line XIII—XIII of FIG. 11.

Once the name of a subscriber to be called is properly positioned and the encoded information on the tape is disposed beneath the head 14, it is necessary to bring the head into contact with the tape and to move it across the tape by means of the drive screw 15. The head 14 shown in contact with the tape in FIG. 5 is supported by a carriage 105 which is slidable on rods 106 and 107, both of which extend transversely across the machine beneath the feed screw 15. The rod 106 acts as a pivotal support for the carriage 105 and the ends of the rods 106 and 107 both terminate in a plate 110 (see FIG. 3) which is secured to rock with the rod 106. Thus by rocking the plate 110, the rod 107 is moved arcuately to swing the carirage 105 so that the head 14 is moved in a clockwise direction as viewed in FIG. 5. To remove the head from contact with the tape, the opposite ends of the rods 106 and 107 are shown as fixed to a lever 108 (see FIG. 16) which is urged by a spring 109 to the position in which the head engages the tape. When the head is moved into contact with the tape, a pin 112 carried by the carriage 105 is brought into engagement with a camming ring 113 adjacent the end of the lead screw 15 and carrying a cam bar 114. The camming ring 113 has the same diameter of the root of the thread on the lead screw so that as the lead screw starts to rotate, the cam bar 114 engages the pin 112 bringing it into the thread of the screw and starting the drive of the transducer and head carried thereby across the tape. The carriage is returnable by a spring 115 which as shown in FIGS. 1 and 6 carries a sheave block 116 over which is trained a cable 117 anchored at one end to a frame plate 118 as shown at 119. The opposite end of the cable passes over sheaves 120 and 121 and is anchored to the carriage as at 122 (see FIG. 6). If the carriage is not released from the drive screw for return to its home position by the spring 115 before it has completely traversed the tape by other means presently to be described, it will be released when the pin 112 reaches the end of the thread of the drive screw. This is accomplished by a cam 124 at the end of the lead screw which has a small diameter registering with the root diameter of the lead screw and a large diameter exceeding the outside diameter thereof to lift the pin 112 out of the screw thread and permit the spring 115 to act. Upon removal of the carriage pin from the lead screw as just described, the carriage is locked in its raised position with the transducer head removed from the tape by a latch lever 126 (see FIG. 3) engaging a shoulder 127 on the plate 110 which, as previously described, rocks with the carriage. Thus the carriage will be retained in its retracted position which is its home or normal position before a decoding cycle of the machine is initiated. A spring 128 urges the lever 126 toward its latching position.

The mechanism just described is basic mechanism for driving the head across the tape and for returning the head to its home position. However in the normal functioning of the machine, the movement of the head will continue only so long as there is coded information on the tape to be read and translated. There are occasions, as will presently be described, when even with the motor which turns the drive screw operating it, it will not be clutched to the drive screw so that the head could remain indefinitely in a position intermediate the ends of the drive screw with the motor continuing to operate. To avoid this, it is necessary to provide timing mechanism which upon the lapse of a predetermined time greater than the time necessary for decoding the longest possible number will effect return movement of the head and deenergize the motor.

Figure 12:
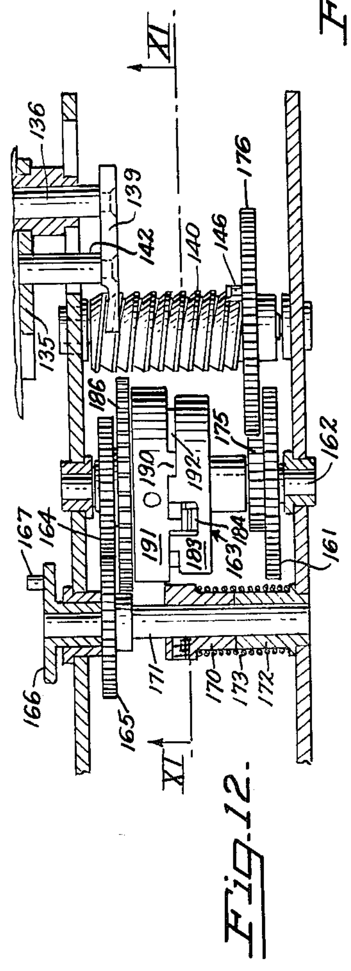
FIG. 12 is an enlarged view of a clutch and timing mechanism with portions in section and looking downwardly on the mechanism illustrated in FIG. 11.
Figure 11:
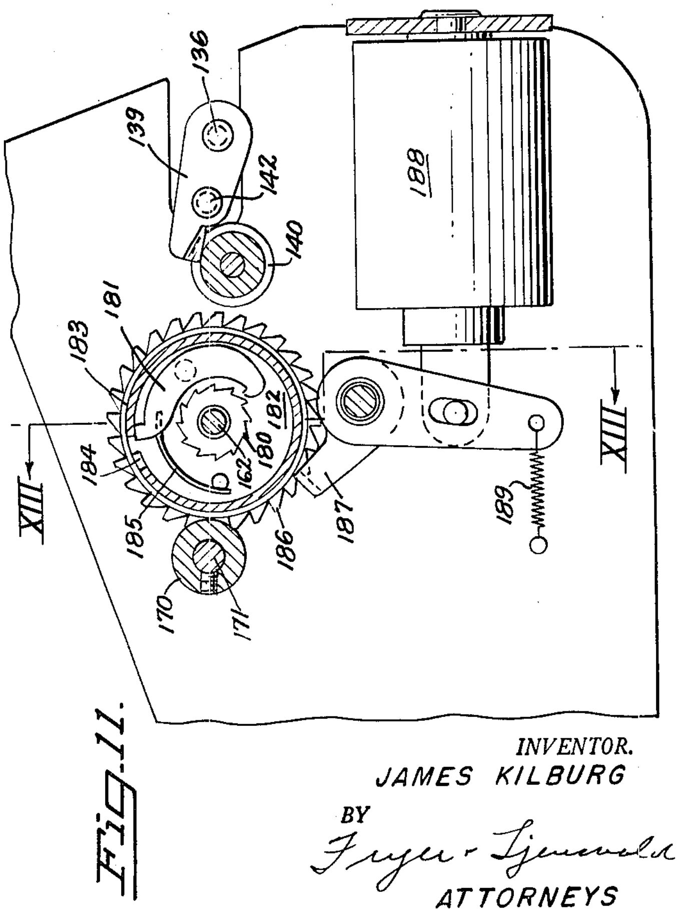
FIG. 11 is an enlarged fragmentary view with parts broken away taken on the line XI—XI of FIG. 12.

Referring again to FIG. 3, wherein it will be recalled that the parts are shown in the position assumed when the head is resting on the tape, the latch 126 will lie behind the shoulder 127 when the transducer head is in its home position and spaced from the tape. To initiate a decoding cycle the tail of the latch 126 is pulled downwardly as by a cable 129 leading toward the front of the machine. Any suitable means such as a starting button on the case of the machine (not shown) may be employed for this purpose. Releasing the plate 110 permits the head to descend onto the tape. At the same time the tail of the latch 126 will have engaged a pin 130 on a latch lever 131 which engages and holds a lever 132 in a position slightly counterclockwise from that shown about the center of its supporting pin 133. Simultaneously with releasing of the head, a spring 134 draws a lever 135 pivoted on a center 136 downwardly. The free end of this lever has a slot embracing a pin 137 on the lever 132 so that it was held against downward movement by latching effect of the lever 131. The lever 135 controls the timing mechanism which includes a finger 139 (see also FIG. 12) which cooperates with a timer lead screw 140. The lever 135 and finger 139 as best shown in FIG. 12 are connected for simultaneous swinging movement about the center of pin 136 by means of a pin 142. Consequently when the head is moved onto the tape, the finger 139 is moved into registry with the thread of the timer feed screw 140 which receives its drive directly from the motor whereas the transducer head is driven through a clutch. Both of the pins 136 and 142 are slidable with respect to the frame and are held, as shown in FIG. 1, in their home or retracted position by a spring 144. A plate 145 joining the inner ends of the pins 136 and 142 rigidly retains them in proper spacing. The timing mechanism just described insures return of the transducer head and deenergization of the motor after a period of time which is longer than that necessary for the reading of a coded telephone number. This is accomplished by means of a pin 146 shown in FIG. 12 fixed with relation to the timing screw so that it rotates therewith and, when the finger 139 reaches the end of the timing screw, the pin 146 engages beneath it to raise it free of the thread and permits its return by the spring 144 of FIG. 1.

Referring back to FIG. 3, when the finger 139 is raised, it also effects raising of the lever 135 which, through the pin 137, swings the lever 132 in a counterclockwise direction. A toe 148 on lever 132 now engages a pin 149 on plate 110 and by swinging plate 110 in a clockwise direction, raises the transducer head permitting its return to the home position by spring 115 of FIG. 1. This, of course, also permits reengagement of the latch 126 and the latch lever 131 so that they assume their before starting positions previously described.

At the same instant that the head is brought into reading position against the tape, the motor which drives the feed screw for the head and the feed screw for the timer is energized. This is accomplished by switch mechanism best shown in FIG. 2 actuated by the rod 142 previously described in conjunction with the timing screw finger. With the rod 142 in the position which it occupies when the head is in its home position and raised from the tape, the rod holds an actuator plate 151 in its uppermost position. This plate is pivotable about the center of rod 136 urged downwardly by a spring 152. Therefore upon lowering of the head into engagement with the tape which is also accompanied by downward swinging movement of the timer screw finger 139, plate 151 swings downwardly engaging and closing a conventional microswitch 153 through a projection 157 which closes the circuit to the motor. This switch is in parallel with the switch 74 previously described for energizing the motor for the purpose of driving the tape. It will be understood as the description proceeds that the same motor 69 employed for driving the tape provides power for driving the feed screw for the head and the feed screw for the timer. Actual turning of the feed screw for the head, however, is accomplished by engagement of the clutch. This clutch is engaged by a solenoid and a low voltage circuit to the solenoid is closed simultaneously with closing of the motor switch 153 by means of a switch 155, one element of which is engaged by a projection 156 on plate 151 at the same time that switch 153 is closed by the projection 157.

The power train from the motor to feed screws is partially shown in FIG. 15 wherein, as will be recalled, motor operation results in turning of both gears 86 and 87. The shaft of gear 87 carries a pinion 159 meshing with a gear 160 which is in turn connected through conventional reduction gearing, not illustrated, with a gear 161 (see FIG. 12) on a shaft 162. This is the driving shaft of a clutch 163 capable of transmitting power through gears 164 and 165 to a coupling disc 166 having a pin 167 which registers with a notch 168 (see FIG. 3) in a complementary coupling disc on the end of the shaft upon which the feed screw 15 is mounted.

Since spring means are employed in the clutch 163 presently to be described which tend to impart reverse torque through the clutch to the coupling disc and lead screw, a one-way brake is provided to prevent such reverse rotation. This brake comprises a bushing 170 fixed against rotation on a shaft 171 to which the coupling disc is fixed and a second bushing of the same diameter fixed to the gear train supporting frame. The shaft 171 is free to rotate in one direction with respect to the bushing 172 but reverse rotation is prohibited by a coil spring 173 embracing both bushings in a well known manner. Feed screw 140 is also driven from the shaft 162 through gears 175 and 176. No clutch is necessary in this drive because rotation of the timing screw performs no function until the finger is brought into contact therewith.

Figure 18:
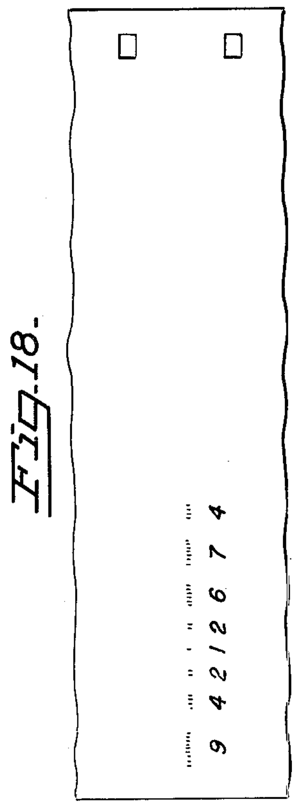
FIG. 18 is an enlarged fragmentary plan of a piece of magnetized tape illustrating an example of the positions assumed by magnetized areas representing a telephone number encoded thereon.

As previously mentioned, the clutch which controls the feed screw for the transducer head is actuated by a solenoid and it should be helpful in understanding the construction of the clutch and the circuits which control the solenoid to first understand the reason for using the solenoid as an actuating means. An enlarged portion of the tape employed in the machine is shown in FIG. 18 with a telephone number encoded thereon with the several magnetic bits representing the number in the form of dots. Since the magnetic bits are not visible, the dots are used simply for the purpose of representing their positions. This telephone number is one which would be used in the operation of nine level dialing wherein it is necessary first to dial the numeral nine, then await a dial tone before dialing the subscriber's number, which in this case is 421–2674, these figures appearing in FIG. 18 would of course not appear on the tape in the position shown. There is, as can be seen in FIG. 18, interdigital spacing between the numbers in the subscriber's telephone number which, with the transducer feed screw operating at the proper speed, will represent time between the dialing of individual digits required in standard telephone circuits to permit the switching equipment therein to function properly. This time is in fact about 530 milliseconds. According to the present invention, a somewhat greater space is left between the digit nine and the first digit of the telephone number. In the present instance, this space represents approximately 560 milliseconds and because it is greater than 530 milliseconds, it will effect disengagement of the clutch which drives the feed screw. Furthermore since the number represented in FIG. 18 is made up largely of lower order digits, it occupies only a portion of the width of the tape, it being understood that some numbers which may contain principally nines and zeros would extend nearly across the tape. Also, considerably more space on the tape is required for fourteen digits which are required in some direct distant dialing operations. Since the number repreesnted on the tape is a short one, it is unnecessary and undesirable for the transducer head to traverse the entire width of the tape and since the unused space following the last digit in the number is obviously more than 530 milliseconds, the same mechanism which stops the head after dialing the first digit nine will become effective again to stop the head very shortly after dialing the last digit. Another occasion for stopping the transducer drive means occurs in certain direct distance dialing wherein an access number, usually three digits, is dialed and the operator must await a dial tone before dialing the area and local telephone number. In such a case, the greater interdigital spacing on the tape will again be employed after the access number.

The clutch to be described is one which upon being engaged by momentary actuation of a solenoid will remain engaged for a portion of a cycle and then automatically become disengaged. The portion of the cycle represents approximately 560 milliseconds in time and is, therefore, somewhat greater than interdigital time. Each time the transducer head reads or decodes one of the bits on the tape, an impulse is sent to an electronic pulse generating circuit, not disclosed in this application but fully disclosed in the application of Kilburg et al., Serial No. 104,689, filed April 21, 1961. Each pulse is amplified in the electronic pulse generating circuit and actuates a switch which creates a pulse in the telephone circuit. In the present application, a second such switch is employed in parallel with the switch used for sending impulses through the telephone circuit and the second switch closes a low voltage circuit to the solenoid which actuates the clutch. Consequently in dialing the number shown in FIG. 18, the transducer will read nine bits and close the switch to the clutch actuating solenoid nine times in rapid succession so that no 560 millisecond time elapses to permit disengagement of the clutch. However, since this greater than interdigital time exists between nine and the first digit of the telephone number, the clutch will be disengaged and will remain disengaged until a dial tone is heard and the clutch is again engaged by depression of a starter button.

Referring to FIGS. 11 to 14, inclusive, the clutch 163 is illustrated as rotatable about the driven shaft 162. Fixed to the shaft 162 is a ratchet wheel 180 engageable by a pawl 181 (FIG. 11) carried by a disc or pawl carrier 182 which is the driven member of the clutch formed on the same hub upon which the gear 164 is pressed. A drum shaped housing or cup 183 surrounds the pawl and has a notch 184 (FIG. 12) in its periphery which receives the tail of the pawl when it is engaged with the ratchet wheel 180. A spring 185 normally tends to move the pawl toward its engaged position but the inner surface of the cup 183 retains it in its disengaged position. Consequently with the pawl engaged and its tail projecting into the notch 184, it is simply necessary to stop rotation of the cup 183, which is traveling with the pawl, so that continued rotation of the pawl will move it to its disengaged position when its tail engages the edge of the notch. Stopping of the cup 183 is accomplished by stopping a ratchet wheel 186 (FIG. 14) with a pawl 187 actuated by a solenoid 188 (FIG. 11) and normally retained in its engaged position by a spring 189. The ratchet wheel 186 is not directly connected with a stop lug 190 (FIGS. 12 and 14) which stops rotation of the cup 183, but this stop lug is carried on a ring 191 and projects into a recess 192 in the edge of the cup. The length of this recess is such that it provides 560 milliseconds of clutch engagement before the lug 190 engages the end of the recess to stop cup 183 and disengage the clutch. The ratchet wheel 186 is free to rotate with respect to the hub of the pawl carrier 182 and is connected to the pawl carrier by a torsion spring 196 (FIGS. 13 and 14) normally tensioned to hold the lug 190 at the end of the recess 192 which it will occupy during engagement of the clutch. Since the clutch is disengaged instantaneously when the edge of the cup rides onto the tail of the pawl 181, the area of the portions in engagement or overlap would be extremely small. To insure secure engagement with the tail end of the pawl a lost motion is provided between the ratchet wheel 186 and the ring 191 (see FIG. 14) where a pin 193 on the ring is shown as projecting through a slot 197 in a flange 194 which is a part of the ratchet wheel 186. This pin is held against one edge of the slot by a spring 195 encircling the pin at one end and extending through a hole in the ratchet wheel at the opposite end. Consequently when the projeetion 190 on the ring stops the cup 183 the pin 193 will move to the opposite end of its slot thereby tensioning spring 195 which will immediately return the pin 193 and consequently the ring 191 to provide additional movement causing firm engagement of the tail of the pawl. Therefore, since it takes 560 milliseconds to disengage the clutch, as long as the solenoid 188 is actuated to permit engagement of the clutch at intervals of time shorter than 560 milliseconds, the clutch will in effect remain in constant engagement.

Figure 3:
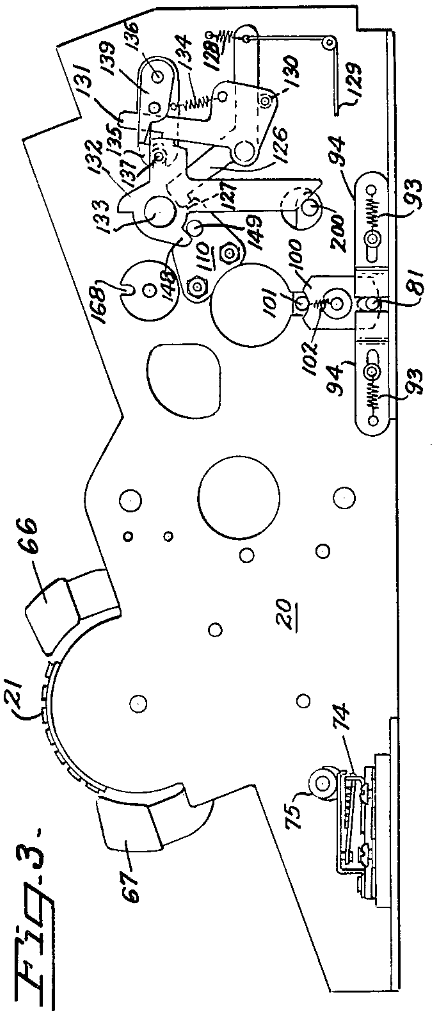
FIG. 3 is a view taken on the line III—III of FIG. 1 illustrating certain control components.

Referring back to FIG. 18 it will be recalled that in nine level dialing the transducer head comes to a stop after the first nine bits on the tape have been decoded. The motor of the machine is, however, still in operation and driving the timer lead screw. Furthermore at the end of the entire number encoded on the tape, the transducer head also stops. The timer lead screw is driven at a rate to establish a time period sufficiently great for the dialing of the longest number that can be encoded on the tape including reasonable dial tone wait. Consequently should the operator abandon a call during the nine level wait period and also after a complete number has been dialed the motor will continue to operate for the overall time cycle, which is approximately thirty-two seconds, and the transducer will be returned to home position and the motor deenergized through means previously described. It is possible, however, that during this latter part of the time cycle, the operator may wish to place another call. Since the first act in placing any call is to adjust the tape to the number to be called, parts of the mechanism moved to adjust the tape are employed instantly to return the transducer head to home position and deenergize the motor. It will be recalled that adjustment of the tape by the mechanism shown in FIG. 2 either manually or with the power drive results in upward movement of the lever 98. The very end of the lever 98 is provided with a pin 200 which extends through a suitable opening in the frame plate 20 and, as shown in FIG. 3, is disposed against an inclined lower end of the tail on the lever 132. Thus raising the pin 200 which occurs upon adjustment of the tape urges the lever 132 to swing counterclockwise as viewed in FIG. 3 and as previously described affects deenergization of the motor and return of the timing mechanism and transducer head to their home positions. This feature of normalizing the machine instantly upon touching the tape adjusting means also provides a means to deliberately stop the machine in the process of dialing if it becomes necessary to answer an incoming call on a multiple line telephone. It is also useful if it suddenly becomes necessary to place a call manually on the conventional telephone dial.

Since the electronic circuit employed in the machine of the present invention must be connected with the telephone lines, any failure in the circuit could have the effect of rendering the telephone unuseable. It is, therefore, desirable that at all times except when the dialing machine is functioning the electronic circuit be shunted for the protection against disabling the telephone. This shunting is accomplished by switch means illustrated in FIG. 6 and also shown in the wiring diagram of FIG. 17 and the same circuitry serves the purpose of energizing the clutch solenoid for initial engagement of the clutch before the solenoid has been energized by pulses resulting from bits on the tape.

Figure 17:
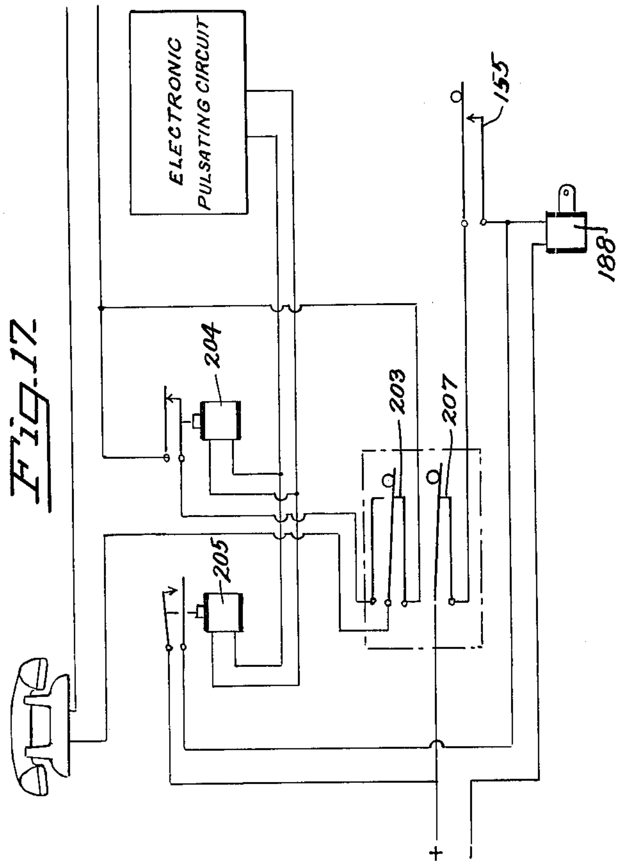
FIG. 17 is a schematic diagram of electrical control and shunting circuit.

FIG. 17 illustrates the condition of the electrical circuit for introducing pulses to the telephone lines with the switches in the condition which they occupy when the transducer head is in its home position and raised from the tape. Thus a double throw switch 203 (see also FIG. 6) closes a shunt circuit in the telephone line rendering the pulse mechanism of the present machine ineffective. The blade of switch 203 moves upwardly into engagement with the opposite pole shortly after initiating a dialing cycle thus breaking the shunt circuit and closing a circuit controlled by a relay 204 which relay is energized by the electronic pulsating circuit to transmit pulses into the telephone lines. Meanwhile a second relay 205, the energizing circuit of which is in parallel with relay 204 is also energized to send pulses to the solenoid 188 which energizes the clutch. It will be recalled that upon movement of the head toward the tape at its home position, a switch 155 (see FIG. 2) is closed to complete a circuit to the solenoid 188. However since the relay 205 is normally in an open position, this circuit is actually not complete and the relay does not produce a first impulse essential to effect engagement of the clutch. The relay 205 is, therefore, shunted by a switch 207 also shown in FIG. 6 which is in its closed position when the head is home. The closing of the switch, as well as holding the blade of switch 203 in its lower position, is accomplished by a lever 208 which is depressed by a cam 209 carried by and movable with the transducer head 105. Thus with the head in its home position, as shown, the relay 205 is shunted and will remain shunted while current flows to the solenoid 188 for initiating operation of the clutch to impart motion to the transducer head drive screw. During the initial movement of the drive screw the cam 209 rides down an incline 210 on the lever 208 permitting the lever to swing upwardly and removing the pressure of pins 211 and 212 thereon from the switch plates. At this time, the solenoid is being actuated by impulses created by the code on the tape and through the relay 205.

I claim:

1. In a machine for dialing telephone numbers encoded on a magnetizable medium in the form of groups of magnetized bits representing digits separated by interdigital spaces, a transducer, means including a clutch for effecting relative movement of the transducer and a coded number on said medium to produce signals through the transducer, means responsive to said signals for engaging the clutch for a period of time required for said relative movement to just exceed said interdigital spaces, whereby a greater space between two coded digits will effect disengagement of the clutch and cause the transducer to pause.

2. The combination of claim 1 in which the means for effecting clutch engagement is electrically controlled, and signals produced by the encoded number through the transducer are employed for directing electrical energy to the clutch control.

3. The combination of claim 1 including means to momentarily close a circuit to engage the clutch to initiate transducer movement until decoding commences to produce signals for continuing such movement.

4. In an automatic telephone dialer of the kind described in which telephone numbers are encoded transversely of an elongate tape and the tape is adjustable longitudinally to selectively present the codes thereon to a decoding station, a source of power, means including reversible gearing for connecting said source to the tape adjusting means for moving the tape rapidly in either direction, and means for manually moving the tape slowly in opposite directions, a control member for said reversible gearing comprising two spaced depressible buttons and a control member for manual movement of the tape comprising a lever presenting an arcuate finger engageable portion disposed between said buttons.

5. The combination of claim 4 including a two directional ratchet means between said lever and tape adjusting means whereby rocking of said lever in opposite directions from a central normal position will effect adjustment of the tape in opposite directions.

6. The combination of claim 5 with means for holding said ratchet means in a disengaged position during adjustment of the tape with power.

7. The combination of claim 4 including detent means for insuring proper registry between codes on the tape and the decoding station, and means for disabling the detent mechanism during adjustment of the tape with power.

8. The combination of claim 4 in which the decoding station includes a transducer movable toward and away from the tape, and means operable upon adjustment of the tape by either control member to move the transducer away from the tape.

9. In an automatic telephone dialer an elongate tape for the reception of coded data representing telephone numbers extending transversely of the tape, a transducer, means to adjust the tape to position a selected code adjacent the transducer, means to move the transducer across the tape in operable position for producing signals derived from said code, said means including a feed screw and a pin engageable therewith and means at the end of said screw for disengaging the pin from the thread thereof.

10. In an automatic telephone dialer an elongate tape for the reception of coded data representing telephone numbers extending transversely of the tape, a transducer, means to adjust the tape to position a selected code adjacent the transducer, means to move the transducer across the tape in operable position for producing signals derived from said code, said means including a source of power, a clutch controlling a drive from said source to move the transducer, and means controlled by spacing between portions of the data encoded on the tape for effecting disengagement of said clutch.

11. In a machine for dialing telephone numbers encoded on a magnetizable medium upon which codes representing individual digits are separated by interdigital spaces, a transducer, means to affect relative motion between the transducer and the medium to produce signals through the transducer, means responsive to said signals to render said motion continuous and responsive to greater than interdigital spacing to discontinue said motion, and manually actuated means to cause said motion to resume.

References Cited by the Examiner

UNITED STATES PATENTS

| | | | |
|---|---|---|---|
| 2,999,133 | 9/1961 | Kilburg et al. | 179—90 |
| 3,040,133 | 6/1962 | Kobler et al. | 179—90 |

FOREIGN PATENTS

| | | |
|---|---|---|
| 567,446 | 11/1958 | Belgium. |
| 860,794 | 2/1961 | Great Britain. |

ROBERT H. ROSE, *Primary Examiner.*

H. W. GARNER, S. J. BOR, *Assistant Examiners.*